United States Patent [19]

Kurosawa

[11] Patent Number: 5,189,569
[45] Date of Patent: Feb. 23, 1993

[54] HEAD DRIVE MECHANISM WITH PIVOTING MECHANISM

[75] Inventor: Yuichi Kurosawa, Tokyo, Japan
[73] Assignee: Asahi Kogaku Kogyo Kabushiki Kaisha, Tokyo, Japan
[21] Appl. No.: 587,663
[22] Filed: Sep. 25, 1990
[30] Foreign Application Priority Data Sep. 26, 1989 [JP] Japan .................. 1-251329

[51] Int. Cl.⁵ .............................................. G11B 5/54
[52] U.S. Cl. ........................................ 360/75; 360/105; 360/109
[58] Field of Search .................. 360/105, 109, 75; 369/219, 223

[56] References Cited

U.S. PATENT DOCUMENTS

| | | | |
|---|---|---|---|
| 4,170,146 | 10/1979 | Owens | 74/89.2 |
| 4,308,564 | 12/1981 | Thompson | 360/105 |
| 4,528,607 | 7/1985 | Thompson | 360/105 |
| 4,652,952 | 3/1987 | Maeda | 360/106 |
| 4,667,524 | 5/1987 | Kozawa et al. | 74/89.15 |
| 4,809,106 | 2/1989 | Inoue | 360/106 |
| 4,835,646 | 5/1989 | Kurosawa et al. | 360/109 |
| 5,012,370 | 4/1991 | Hikichi et al. | 360/105 |
| 5,038,233 | 8/1991 | Inoue | 360/75 |

FOREIGN PATENT DOCUMENTS

| | | | |
|---|---|---|---|
| 804441 | 11/1958 | United Kingdom | 360/105 |
| 1467218 | 3/1977 | United Kingdom | 360/105 |
| 1599053 | 9/1981 | United Kingdom | 360/105 |

Primary Examiner—Joseph L. Dixon
Assistant Examiner—David L. Robertson
Attorney, Agent, or Firm—Sandler, Greenblum & Bernstein

[57] ABSTRACT

A head drive mechanism is associated with a disk driving device. A disk member is mounted and driven to be rotated on the disk driving device. A support member carries a head member which is capable of recording signals on the disk member, and reproducing the same from the disk member. The support is driven to slide such that the head member is moved in the radial direction of the disk member, and there is provided a pivot member for pivoting one end of the support member in a direction orthogonal to the sliding direction of the support member such that the other end of the support member is swingable. An actuator is provided on the other end of the support member for driving the support member to swing.

10 Claims, 4 Drawing Sheets

HEAD DRIVE MECHANISM WITH PIVOTING MECHANISM

BACKGROUND OF THE INVENTION

The present invention relates to a head drive mechanism associated with a disk drive device.

Electronic still video cameras are designed so that magnetic heads are used for recording or reproducing video signals onto or from video floppy disk (magnetic disks). While the magnetic disk is not rotated, it may be deformed if the magnetic head is kept abutting against the magnetic disk. Thus, the known practice is to detach (i.e., disengage) the magnetic head from the magnetic disk.

Conventionally, an actuator or the like has been employed to detach the magnetic head from the magnetic disk.

However, a disadvantage pertaining to the use of such an actuator for moving the magnetic head by moving the carriage itself is that the disk drive device tends to become complicated in construction and also costly because additional component parts are required.

SUMMARY OF THE INVENTION

In view of the foregoing problems, an object of the present invention is to provide an improved head drive mechanism in which a head is made detachable from a disk with a simple mechanism.

For the object, according to the present invention, there is provided a head drive mechanism associated with a disk driving device. A disk member is mounted and driven to be rotated on the disk driving device. The head drive mechanism comprises a support member carrying a head member which is capable of recording signals on the disk member and reproducing the same from the disk member. The support member is driven to slide such that the head member is moved in the radial direction of the disk member. The head drive mechanism further comprises:

pivot means for pivoting one end of the support member in the direction orthogonal to the sliding direction of the support member such that the other end of said support member is swingable; and actuating means provided on the other end of the support member for driving the support member to swing.

In the head drive mechanism according to the present invention, the support member carries a head member which is slightly swung with one end of the support member being pivoted. The swinging causes the head member to move away from the disk when the actuator is driven.

Consequently, the head is made detachable from the disk with a simple arrangement.

DESCRIPTION OF THE ACCOMPANYING DRAWINGS

DESCRIPTION OF THE EMBODIMENTS

Figure 1:
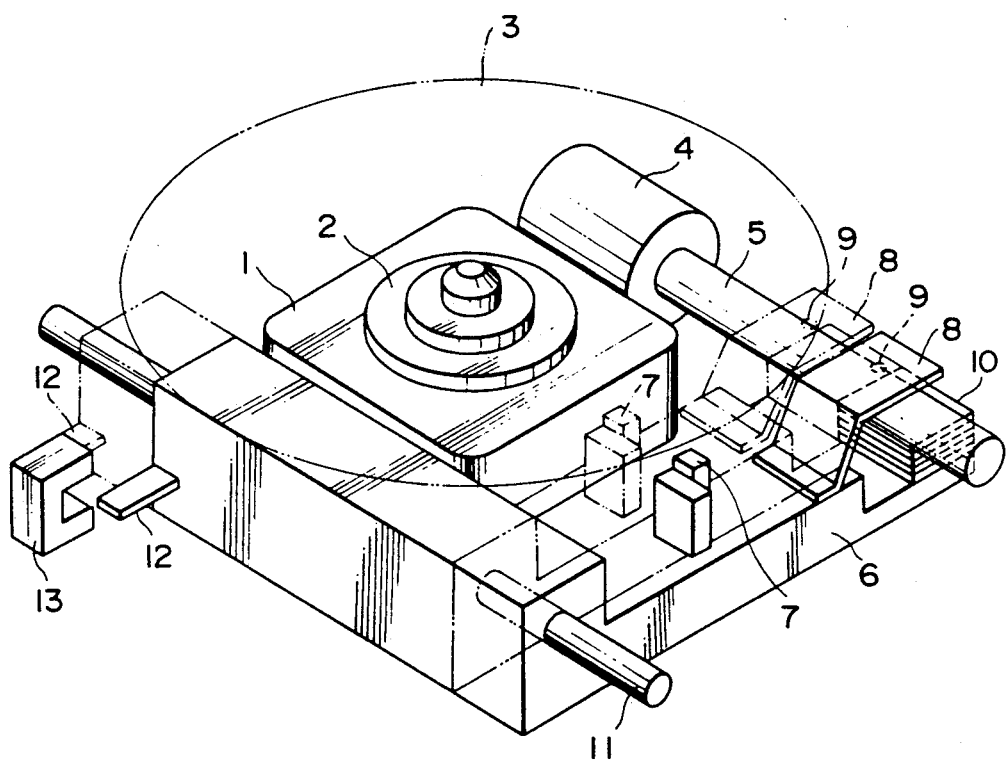
FIG. 1 is a perspective view of a head drive mechanism associated with a disk drive device embodying the present invention.

FIG. 1 is a perspective view illustrating the construction of a head drive mechanism embodying the present invention.

As shown in FIG. 1, the head drive mechanism comprises a spindle motor 1 used for rotating a flywheel (spindle chuck) 2 and a video floppy disk 3 mounted and chucked on the flywheel 2 for rotation and used for recording or reproducing a video signal. A step motor 4 is used for rotating a lead screw 5 as a drive means, and a carriage 6 is fitted with a magnetic head 7.

The component parts further include a ball 9 fastened to a plate spring 8 and engaged with the lead screw 5. A direct-acting actuator 10 composed of, e.g., laminated piezoelectric ceramics, is disposed between the carriage 6 and the lead screw 5. The plate spring 8, is used for biasing the carriage in such a way that the actuator 10 on the carriage 6 and the ball 9 are respectively pressed against the lead screw 5; and a guide bar 11 acts as a guide means used for guiding the carriage 6 to be moved.

In addition, a projection 12 is secured therein to the carriage 6 and arranged so that it passes the position opposite to a detection portion of a photocoupler 13, or the like, secured onto a base plate (not shown).

Figure 2:
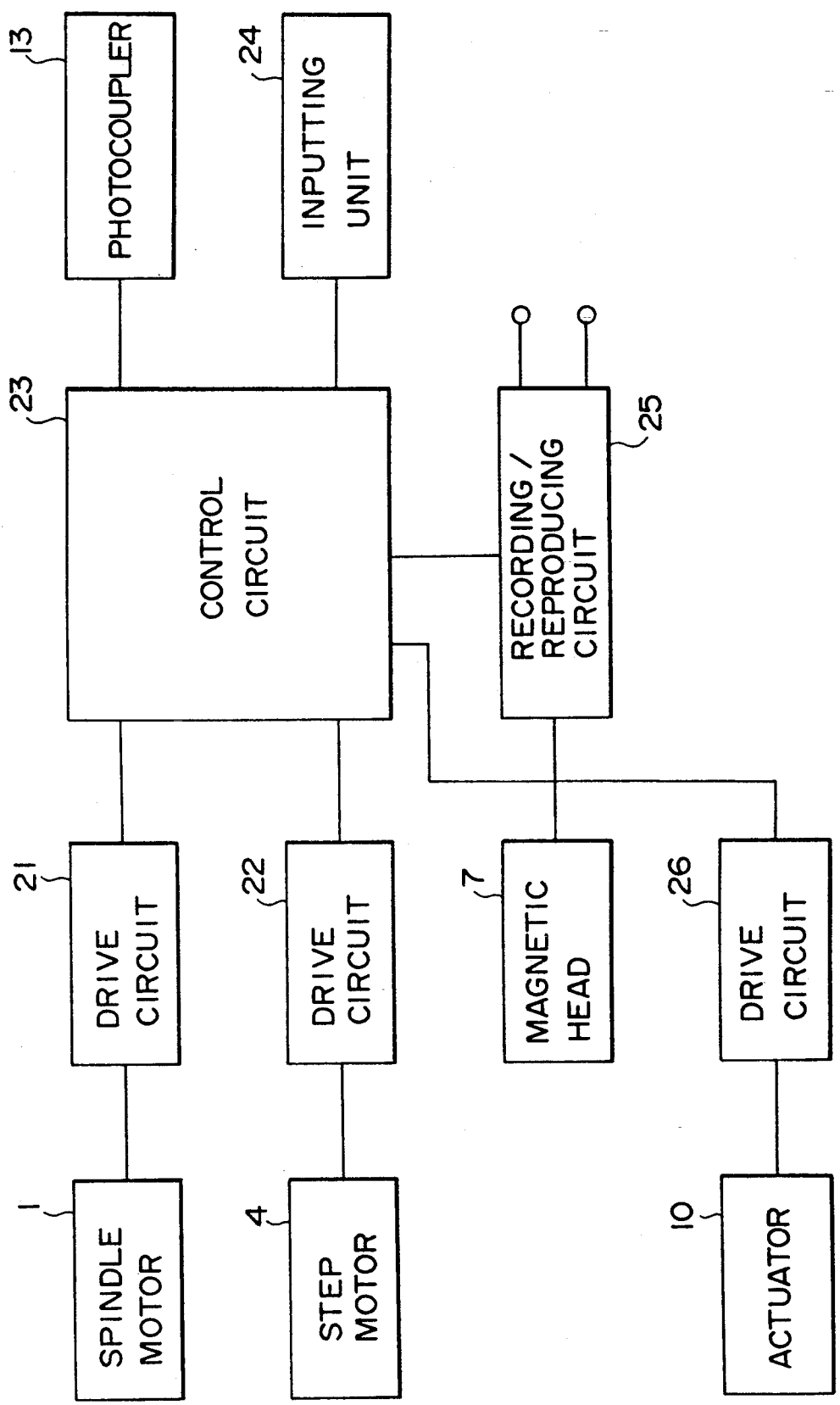
FIG. 2 is a block diagram of the head drive mechanism embodying the present invention.

FIG. 2 is a block diagram illustrating the configuration of a head drive mechanism embodying the present invention.

As shown in FIG. 2, drive circuits 21, 22 are used for driving the spindle motor 1 and the step motor 4, respectively. A control circuit 23 shown therein comprises, e.g., a microcomputer or the like and controls each of the circuits and means in compliance with the operation of an input means 24 such as a switch or button. A recording/reproducing circuit 25 modulates the signal supplied from a circuit (not shown) and feeds the modulated signal to the magnetic head 7. Moreover, the recording/reproducing circuit 25 demodulates the signal thus reproduced from the magnetic head 7 and delivers the demodulated signal to the circuit (not shown). Numeral 26 denotes a drive circuit for driving the actuator 10.

The operation will subsequently be described. When the input means 24 is operated to instruct, e.g., a signal to be recorded, the control circuit 23 drives the spindle motor 1 via the drive circuit 21, whereby the video floppy disks 3 (FIG. 1) is rotated. The control circuit 23 also drives the step motor 4 via the drive circuit 22, whereby the lead screw 5 is rotated. As the ball 9 is kept engaged with the lead screw 5, the ball 9, and hence also the carriage 6 fitted with the ball 9 is guided and moved by the guide bar 11. As a result, the magnetic head 7 fixed to the carriage 6 is moved in the direction parallel to the surface of the video floppy disk 3 and caused to face a predetermined track.

Figure 3:
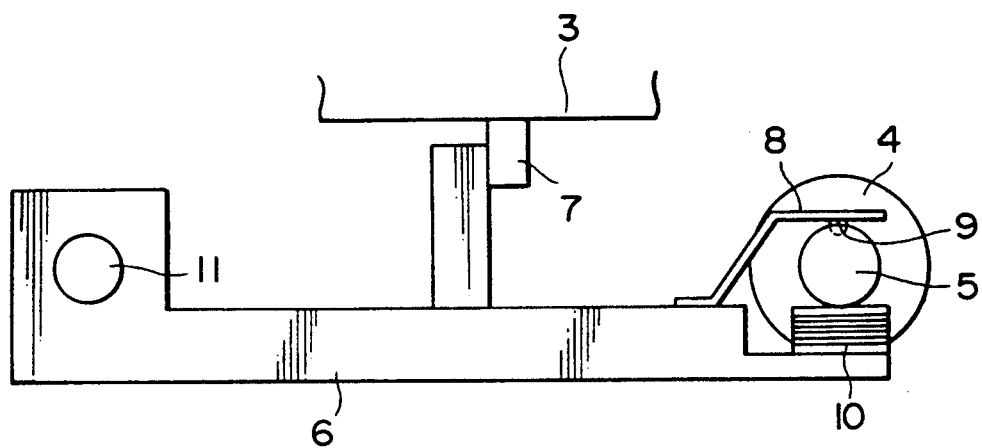
FIG. 3 is a side view of the head drive mechanism embodying the present invention, depicted while the magnetic head is kept abutting against a video floppy disk.
Figure 4:
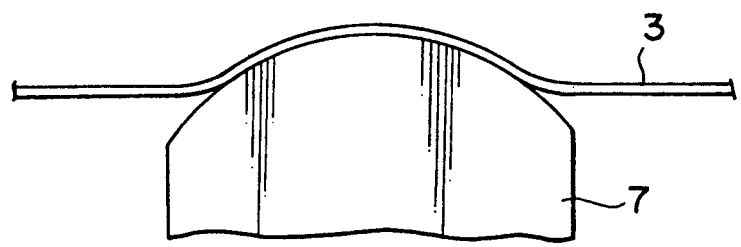
FIG. 4 is a side view illustrating the magnetic head kept abutting against the video floppy disk.

At this time, as shown in FIGS. 3 and 4, the magnetic head 7 comes in contact with the video floppy disk 3, whereas the video floppy disks 3 resiliently deforms in such a manner that its contact part slightly protrudes as shown by the exaggerated view in FIG. 4.

The video signal received from the circuit (not shown) is modulated in the recording/reproducing circuit 25, and the signal thus modulated is supplied to the magnetic head 7. In this way, the video signal is recorded on a predetermined track of the video floppy disk 3.

When reproduction is instructed, on the other hand, the magnetic head 7 and the video floppy disk 3 are driven likewise. Then the video signal reproduced by the magnetic head 7 is demodulated in the recording/reproducing 25 before being delivered to a CRT (not shown).

When the carriage 6 is located at a predetermined position, the projection 12 is located opposite to the detection portion of the photocoupler 13 and intercepts the light. The control circuit 23 monitors the output of the detection circuit 13, and, when the output is inverted, suspends the movement of the carriage 6. In this way, the carriage 6 is prevented from moving to the inner (or outer) periphery of the video floppy disk more than required.

When an instruction as to stopping the recording or reproducing operation is given, the control circuit 23 stops to drive the drive circuit 21 so as to stop the rotation of the spindle motor 1. The control circuit 23 then drives the actuator 10 via the drive circuit 26.

Figure 5:
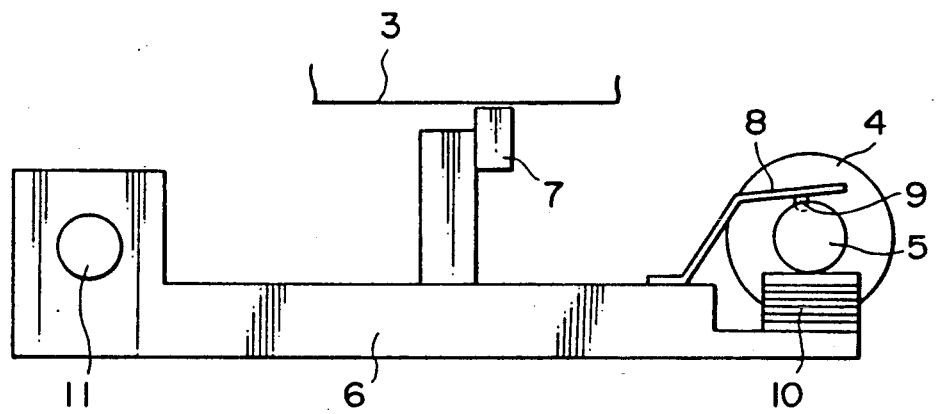
FIG. 5 is a side view illustrating the magnetic head detached from the video floppy disk in the head drive mechanism embodying the present invention.
Figure 6:
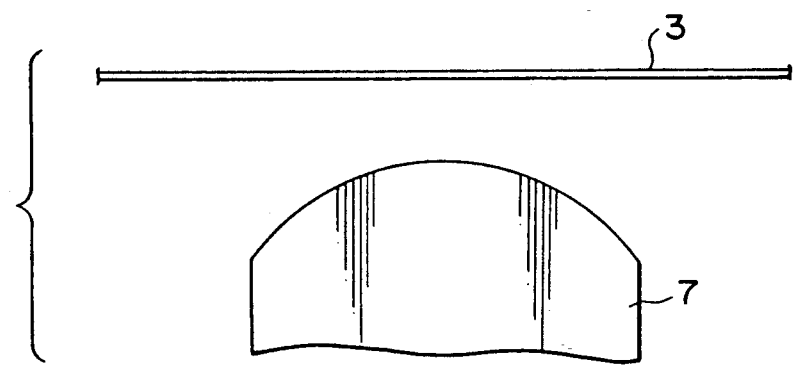
FIG. 6 is a side view illustrating the magnetic head detached from the video floppy disk.

As a result, the actuator 10 expands as shown in FIG. 5 and the carriages 6 slightly revolves (i.e., pivots) round the guide bar 11 clockwise, against the biasing force of the plate spring 8. Thereby as shown in an enlarged view of FIG. 6, the magnetic head 7 is detached from the video floppy disk 3.

The actuator 10, composed of laminated piezoelectric ceramics, remains expanded for a while once it has been expanded, thus functioning like a capacitor. The resulting relatively low consumption of drive power makes the aforementioned arrangement economical.

A flange may also be employed as the actuator 10. Moreover, the plate spring 8 may be replaced with rubber or a resilient member which produces elastic force. Further, use can be made of any other mechanism, in addition to the lead screw, which will not interfere with the driving and revolution of the carriage 6.

Figure 7:
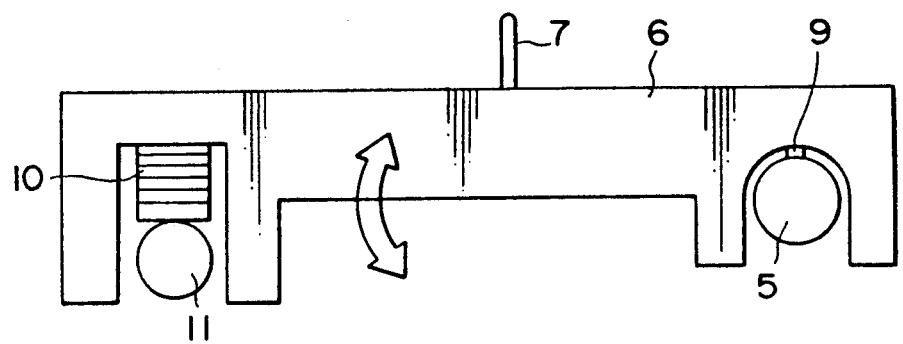
FIG. 7 is a sectional view of the construction of another head drive mechanism embodying the present invention.

FIG. 7 shows the construction of another head drive mechanism embodying the present invention.

When the carriage 6 moves in the direction parallel to the disk (in a direction perpendicular to the page surface in the drawing) as the lead screw 5 rotates in this embodiment, the lower edge face of the actuator 10 slides on the guide bar 11. When the actuator 10 is driven, moreover, the carriage 6 revolves round the lead screw 5 clockwise or counterclockwise.

Although the carriage 6 has been so arranged as to press itself against the guide bar 11 by its own weight in the embodiment shown in FIG. 7, a resilient member such as a spring or rubber may be employed for the purpose as in the case of FIG. 1.

Although the head drive mechanism according to the present invention has been described as applicable to an electronic still video camera, the head drive mechanism according to the present invention may also be applicable to other apparatus.

In the head drive mechanism according to the present invention as set forth above, the distance between one end of the drive or guide means and the carriage is increased or decreased by the actuator, to revolve the carriage with the other end of the drive or guide means acting as a fulcrum. Consequently, the head can be simply detached from the disk at any position. In addition, production cost still remains low.

What is claimed is:

1. A head drive mechanism associated with a disk driving device, a disk member being mounted and driven to be rotated on said disk driving device, said head drive mechanism comprising a support member carrying a head member which is capable of recording signals on said disk member and reproducing the signals from said disk member, said support member being driven to slide such that said head member is moved in a radial direction of said disk member, said head drive mechanism further comprising:

pivot means for pivoting said support member in a direction orthogonal to the sliding direction of said support member such that a first end of said support member is swingable; and actuating means provided on said first end of said support member for driving said support member to swing.

2. The head drive mechanism according to claim 1, wherein said pivot means comprises a guide means for guiding said support member in a direction parallel to the surface of said disk member, and wherein said head drive mechanism further comprises drive means for driving said support member to slide along said guide means.

3. The head drive mechanism according to claim 2, wherein said drive means comprises a lead screw, and wherein said support member comprises an engaging member to be engaged with said lead screw, said support member being slid with the engagement between said lead screw and said engaging member upon rotation of said lead screw.

4. The head drive mechanism according to claim 3, wherein said engaging member and said lead screw are arranged at said first end of said support member, wherein said actuating means is provided between a portion of said support member at said first end and said lead screw, and wherein said head drive mechanism further comprises a biasing member for biasing said support member toward said lead screw, whereby said support member is swung when said actuating means drives said support member to move away from said lead screw.

5. The head drive mechanism according to claim 1, which further comprises guide means for guiding said support member in a direction parallel to the surface of said disk member, wherein said pivot means comprises drive means for driving said support member to slide along said guide means.

6. The head drive mechanism according to claim 5, wherein said drive means comprises a lead screw, and wherein said support member comprises an engaging member to be engaged with said lead screw, said support member being slid with the engagement between said lead screw and said engaging member upon rotation of said lead screw.

7. The head drive mechanism according to claim 6, wherein said engaging member and said lead screw are arranged at a second end of said support member, wherein said actuating means is provided between a portion of said first end of said support member and said guide means, whereby said support member is swung when said actuating means drives said support member to move away from said guide means.

8. The head drive mechanism according to claim 1, which further comprises control means for driving said actuating means when said support member is located at a predetermined position.

9. The head drive mechanism according to claim 8, wherein said control means comprises detect means for detecting that said support member is located at said predetermined position.

10. The head drive mechanism according to claim 9, wherein said detect means comprises a fixedly disposed photocoupler and a light shield member, said light shield member being provided on said support member, and wherein said light shield member shields the light of said photocoupler when said support member is located at said predetermined position.

* * * * *